US012748602B2

(12) United States Patent
Tammewar et al.

(10) Patent No.: US 12,748,602 B2
(45) Date of Patent: Sep. 29, 2026

(54) SUPERVISED EXECUTION OF SOFTWARE APPLICATIONS ON VEHICLE COMPUTING DEVICES

(71) Applicant: Zoox, Inc., Foster City, CA (US)

(72) Inventors: Aditya Tammewar, Fremont, CA (US); Irusha Dilshan Vidanamadura, Sunnyvale, CA (US); Andrey Shigapov, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 174 days.

(21) Appl. No.: 18/744,049

(22) Filed: Jun. 14, 2024

(65) Prior Publication Data

US 2025/0383886 A1 Dec. 18, 2025

(51) Int. Cl.
*G06F 9/445* (2018.01)
*G06F 8/41* (2018.01)
*G06F 9/48* (2006.01)

(52) U.S. Cl.
CPC .............. *G06F 9/445* (2013.01); *G06F 8/433* (2013.01); *G06F 9/485* (2013.01)

(58) Field of Classification Search
CPC ........... G06F 9/445; G06F 8/433; G06F 9/485
See application file for complete search history.

(56) References Cited

U.S. PATENT DOCUMENTS

| | | | | |
|---|---|---|---|---|
| 11,409,508 | B1 * | 8/2022 | Toub | G06F 8/656 |
| 2014/0074330 | A1 * | 3/2014 | Malone | B60W 20/00 701/99 |
| 2014/0152430 | A1 * | 6/2014 | Ohki | H04M 1/67 340/425.5 |
| 2019/0286128 | A1 * | 9/2019 | Kaji | B60W 50/14 |
| 2020/0031348 | A1 | 1/2020 | Xiang et al. | |
| 2020/0314023 | A1 * | 10/2020 | Sasaki | H04L 47/2475 |
| 2022/0194431 | A1 | 6/2022 | Chu et al. | |
| 2022/0204044 | A1 * | 6/2022 | Lida | G06F 11/2038 |
| 2022/0274610 | A1 | 9/2022 | Chen | |
| 2024/0425082 | A1 * | 12/2024 | Kim | B60W 60/00188 |
| 2025/0187606 | A1 * | 6/2025 | Zhu | B60L 1/003 |
| 2025/0342014 | A1 * | 11/2025 | Stapelfeldt | G06F 8/34 |

FOREIGN PATENT DOCUMENTS

WO WO2024036633 A1 2/2024

OTHER PUBLICATIONS

Search Report and Written Opinion for International Application No. PCT/US25/33319, Dated Oct. 16, 2025, 11 pages.

* cited by examiner

*Primary Examiner* — Hyun Soo Kim
(74) *Attorney, Agent, or Firm* — Lee & Hayes, P.C.

(57) ABSTRACT

Techniques for supervised execution of software applications on a vehicle computing device. In some cases, an example method may include receiving a first request to operate a vehicle in a first operational mode. The method may further include determining that the first operational mode is associated with a first set of software applications comprising a first software application. The method may further include based at least in part on receiving the first request, initiating execution of the first software application. The method may further include, based at least in part on receiving the first request and determining that a second software application is outside the first set, at least one of stopping execution of the second software application or refraining from initiating execution of the second software application.

20 Claims, 6 Drawing Sheets

SUPERVISED EXECUTION OF SOFTWARE APPLICATIONS ON VEHICLE COMPUTING DEVICES

BACKGROUND

Vehicles, such as autonomous vehicles, use complex computing systems to execute software applications associated with detecting objects in the environment, predicting object trajectories, determining vehicle trajectories, and/or controlling the vehicle. However, existing vehicle computing architectures often fail to effectively manage the execution of software applications in a manner configured to enhance the safety and/or reliability of vehicle operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
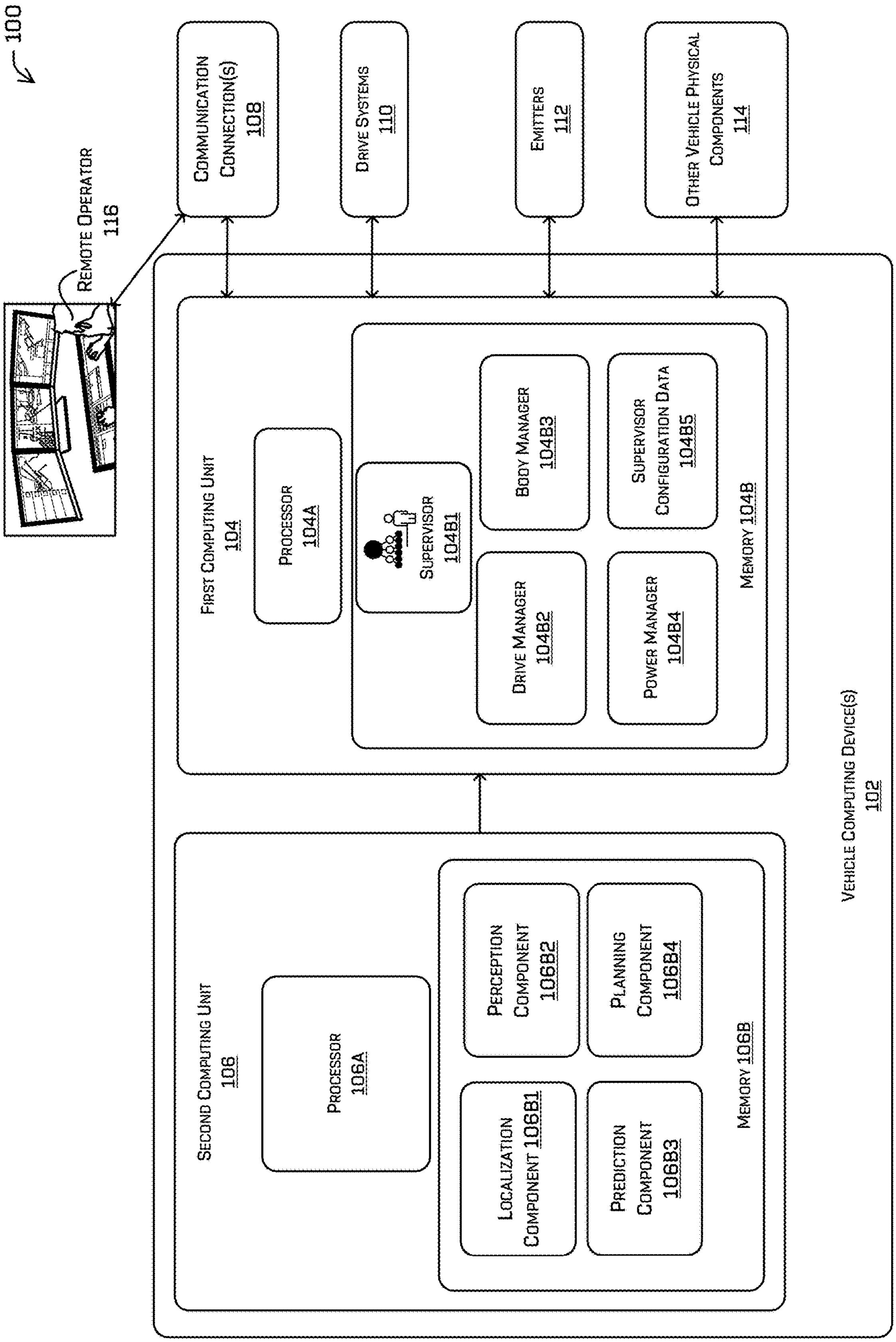
FIG. 1 depicts an environment for supervised execution of software applications on a set of vehicle computing devices.

This disclosure describes techniques for: (i) managing an operational state of a vehicle, (ii) disabling execution of software application(s) in unrelated operational states, and/or (iii) determining an arrangement for launching a set of software applications (e.g., a set of software applications associated with a vehicle's operational state) based on operational dependencies between those applications. For example, in some cases, an example system may map operational states of a vehicle to different sets of software application. In some cases, the system disables execution of a software application if the vehicle is in an operational state to which the software application is not mapped. As another example, in some cases, the system restricts the ability to transition between operational states of a vehicle if transition requirements (e.g., safety-related transition requirements) associated with such a transition are not satisfied. As another example, in some cases, the system delays the launch of a software application that is operationally dependent on other software application(s) based on the minimum launch delay periods associated with those other software application(s). In some cases, "launching" a software application refers to at least one of initiating execution of and/or executing the software application. In some cases, a software application is launched when the software application is loaded onto the memory and/or when the instructions associated with the software application are executed by a processor.

In some cases, the techniques described herein enable conservative and/or efficient use of computing resources of a resource-constrained computing platform associated with a vehicle, such as computing resources associated with a vehicle's low-level controller unit. However, while various implementations of the disclosed techniques are described with reference to managing usage of computing resources of a low-level controller unit, a person of ordinary skill in the relevant technology will recognize that the disclosed techniques may be used to manage computing resource usage for other computing units and/or devices, such as computing units and/or devices unrelated to a vehicle and/or non-resource-constrained computing units and/or devices. In some cases, a resource-constrained computing platform is configured to perform real-time and/or near-real-time processing tasks.

In some cases, the techniques described herein relate to a vehicle computing system that includes at least two computing units: a high-level controller unit and a low-level controller unit. In some cases, the high-level controller unit is configured to: (i) detect an object in the vehicle's environment based on sensor data associated with the environment, (ii) determine a predicted trajectory for an object detected in the vehicle's environment (e.g., based on sensor data associated with the environment), and/or (iii) determine a trajectory for controlling the vehicle (e.g., based on the predicted object trajectory). In some cases, the high-level controller is configured to perform operation(s) associated with one or more machine learning and/or artificial intelligence models (e.g., model(s) configured to detect an object in the vehicle's environment, determine a predicted trajectory for a detected object, and/or determine a trajectory for controlling the vehicle).

In some cases, the low-level controller is configured to control one or more drive components of the vehicle (e.g., based on a vehicle's operational state and/or based on a trajectory generated by the high-level controller; based on control commands, such as steering commands, generated based on the vehicle's operational state and/or trajectory; and/or the like). In some cases, the low-level controller is configured to control one or more actuators (e.g., throttle actuator(s), brake actuator(s), steering actuator(s), transmission actuator(s), suspension actuator(s), door actuator(s), door lock actuator(s), trunk actuator(s), windshield wiper actuator(s), heating, ventilation, and air-conditioning (HVAC) actuators, seat position actuators, and/or the like), emitters, and/or other physical components associated with the vehicle. In some cases, the low-level controller is configured to (e.g., while the low-level controller is in a mission mode) translate high-level command(s) (e.g., representing a determined trajectory for the vehicle) generated by the high-level controller into low-level signals(s) for controlling the drive component(s) of the vehicle.

In some cases, the low-level controller includes one or more safety-critical and/or automotive-grade hardware components, such as at least one of: (i) a safety-critical and/or automotive-grade processor, (ii) a safety-critical and/or automotive-grade memory (e.g., random access memory (RAM)), or (iii) a safety-critical and/or automotive-grade persistent storage (e.g., hard disk). Examples operations and/or configurations for the high-level controller and the low-level controller are described in U.S. patent application Ser. No. 17/707,353, filed on Mar. 29, 2022 and entitled "Limiting Vehicular Operation with a Faulted Component," which is incorporated by reference herein in its entirety and for all purposes.

In some cases, the techniques described herein relate to managing execution of software applications on the hardware component(s) (e.g., safety-critical and/or automotive-grade hardware component(s)) associated with the low-level controller. For example, in some cases, the system may determine a vehicle's operational state and disable execution of any software applications that are not related to the operational state on the hardware component(s) associated with the low-level controller. As another example, in some cases, the system may determine that a first software application is operationally dependent on a second software application and delay launch of the first software application on the low-level controller's hardware component(s) by a delay period (e.g., a delay period determined based on an expected launch time of the second software application). As another example, in some cases, the system may define a sequence of software application launches after transition to an operational state, where the sequence's ordering may be determined based on assignment of software applications to the operational state and/or based on operational dependencies between those software applications.

In some cases, one objective behind managing execution of software applications on the hardware component(s) associated with the low-level controller may be to enhance the safety and/or reliability of vehicle operations. For example, in some cases, the system may ensure that limited computational resources associated with the low-level controller are not wasted on software applications that are not associated with the vehicle's current operational state and/or on software applications that are not expected to be useful due to their operational dependencies on other software applications that have not yet launched. In some cases, by conserving the computational resources associated with the low-level controller, the system enables more optimal performance of essential software applications (e.g., software applications that relate to the vehicle's current operational state and/or that are not operationally dependent on any unlaunched software applications). More optimal performance of essential software applications may lead to more reliable and/or safer operation of the vehicle. In some cases, by intelligently managing which software applications execute on the low-level controller's hardware and/or when those applications execute, the system can avoid memory contention and ensure the most safety-critical applications have greater access to memory resources. This may enable essential applications, such as applications that relate to the vehicle's current operational state, to perform more optimally. Given that the low-level controller may have relatively low performance capabilities compared to other computing systems in the vehicle, conserving the computational resources associated with the low-level controller may be especially important for preventing issues like memory contention between applications. Memory contention may lead to unexpected behaviors and/or collisions that could compromise vehicle safety. Accordingly, by reducing the likelihood of memory contention, the techniques described herein can enhance safety and/or reliability of a vehicle such as an autonomous vehicle.

In some cases, by conserving the computational resources associated with the low-level controller, the system enables execution of software application(s) using the safety-critical and/or automotive-grade hardware component(s) associated with the low-level controller (e.g., as opposed to the non-safety-critical and/or non-automotive-grade hardware component(s) associated with the high-level controller).

For example, the vehicle computing system may be configured to perform operation(s) associated with a validation component that is configured to evaluate the vehicle's trajectory to determine a likelihood that the trajectory will lead to an undesirable driving event such as a collision. In some cases, more conservative use of the computational resources associated with the low-level controller enables executing operations associated with the validation component using the computational resources associated with the low-level controller (e.g., using safety-critical and/or automotive-grade hardware component(s)), as opposed to the computational resources associated with the high-level controller (e.g., using non-safety-critical and/or non-automotive-grade hardware component(s)). Example operations and/or configurations for such a validation component are described in U.S. patent application Ser. No. 16/218,182 titled "Collision Avoidance System with Trajectory Validation" filed Dec. 12, 2018, U.S. patent application Ser. No. 16/218,182 titled "Collision Avoidance System" filed Dec. 26, 2018, and U.S. patent application Ser. No. 16/588,529 titled "Collision Avoidance Perception System" filed Sep. 30, 2019, the entirety of both of which are herein incorporated by reference for all purposes.

Accordingly, in some cases, the system may enhance safety and/or reliability of a vehicle by managing execution of software applications on the hardware component(s) associated with the low-level controller to conserve and/or manage the use of those hardware component(s). Additionally, in some cases, the system may enhance the safety and/or reliability of the vehicle by ensuring that software applications are launched in a proper sequence to avoid errors that may otherwise occur if a software application is launched before another software application on which it operationally depends.

For example, in some cases, the system may determine that a first software application for controlling the vehicle's throttle actuator is operationally dependent on a second software application for monitoring the vehicle's speed sensors. In this example, if the first software application were to be launched before the second software application, the first software application may attempt to control the throttle actuator based on invalid speed data, which may cause the vehicle to accelerate in an unsafe manner. To avoid this type of error, the system may ensure that the second software application is successfully launched before launching the first software application.

As another example, in some cases, the system may determine that a software application for performing object detection based on sensor data is operationally dependent on another software application that provides a data streaming service for the sensor data. In this example, if the object detection software application were to be launched before the data streaming software application, the object detection software application may be unable to access the sensor data needed to perform object detection function(s). To avoid this type of error, the system may ensure that the data streaming software application is successfully launched and initialized before launching the object detection software application.

In some cases, the techniques described herein include managing (e.g., determining, updating, and/or the like) an operational state associated with a vehicle. The operational state may represent a functionality (e.g., a set of functionalities) that is expected of the vehicle (e.g., of a vehicle component, such as the low-level controller of the vehicle) at a given time. In some cases, the operational state of a vehicle represents: (i) whether a particular functionality (e.g., a particular set of functionalities) is expected of the vehicle at an associated time, and/or (ii) whether the vehicle is transitioning from one expected functionality (e.g., a first set of expected functionalities) to another expected functionality (e.g., a second set of expected functionalities).

For example, in some cases, the operational state associated with a vehicle may represent whether the vehicle is in a "steady state" with respect to an operational mode or is transitioning from one operational mode to another operational mode. An operational mode may represent an expected vehicle functionality (e.g., an expected set of vehicle functionalities). In some cases, an operational mode is determined to be in a "steady state" at a given time if the vehicle is not transitioning from and/or to the operational mode at the given time. In some cases, the system may determine that the vehicle is transitioning from a first operational mode to a second operational mode based on determining that a requirement for transition from the first operational mode to the second operational mode is satisfied.

Accordingly, in some cases, a vehicle may be associated with a set of M operational modes each associated with a respective functionality set from a set of M functionality sets. Examples of operational modes include a "mission" mode, a "remote" mode, an "operator" mode, a "sleep" mode, a "charging" mode, an "autonomous navigation" mode, a "semi-autonomous navigation" mode, a "manual navigation" mode, an "initial" mode, and a "shutdown" mode, as further described below.

In some cases, a "mission" mode is associated with "localized" control of a vehicle, such as the control of a vehicle by a driver and/or a vehicle computing device. In some cases, a "remote" mode is associated with remote control of a vehicle, such as by a teleoperation component. In some cases, an "operator" mode is associated with update of at least one software application associated with the vehicle (e.g., at least one software application deployed on a low-level controller of the vehicle), storage (e.g., download) of data onto a storage resource associated with the vehicle (e.g., a storage resource associated with a low-level controller of the vehicle), and/or update of configuration data associated with the vehicle (e.g., associated with a software application deployed on a low-level controller of the vehicle, such as with a supervisor software application deployed on the low-level controller). In some cases, a "sleep" mode is associated with operation of at least one vehicle component (e.g., a low-level controller of the vehicle) with reduced power consumption. In some cases, a "charging" mode is associated with charging of a power source associated with the vehicle. In some cases, an "autonomous navigation" mode is associated with control of the vehicle based on a trajectory generated by a computing device associated with the vehicle. In some cases, a "manual" navigation mode is associated with the control of the vehicle based on driver input. In some cases, a "semi-autonomous navigation" mode is associated with control of the vehicle based on both a trajectory generated by a computing device associated with the vehicle and driver input. In some cases, an "initial" mode is associated with boot-up and/or restart of a vehicle component (e.g., the low-level controller of the vehicle, a supervisor software associated with the low-level computer, and/or the like) and/or associated with a request to update configuration data associated with a vehicle component (e.g., the low-level controller of the vehicle, a software application deployed on the low-level computer, configuration data associated with the low-level computer, a supervisor software associated with the low-level computer, and/or the like). In some cases, a "shut-down mode" is associated with powering off and/or shutting down at least one vehicle component (e.g., the low-level controller of the vehicle, a vehicle computing device associated with the vehicle, and/or the like).

In some cases, the "mission" mode is associated with control of a vehicle by a person and/or a system that is on-board the vehicle. Accordingly, in some cases, the mission mode includes at least one of the autonomous navigation mode, the manual navigation mode, or the semi-autonomous navigation mode. In some cases, the "remote" mode is associated with control of a vehicle by a person and/or a system that is remote from the vehicle (e.g., that is not on-board the vehicle). Examples of remote modes include a mode that is associated with control of a vehicle by a teleoperation component, such as by a teleoperator human agent and/or a teleoperator computing device. In some cases, teleoperation component may perform at least some of the techniques described in U.S. Pat. No. 10,268,191, filed Jul. 7, 2017, and entitled "Predictive Teleoperator Situational Awareness," which is incorporated by reference herein in its entirety and for all purposes.

In some cases, the system is configured to operate in a test mode, which may be used during testing and/or validation of a vehicle and/or one or more vehicle components. The test mode may include operating a reduced set of software applications (e.g., compared to the mission mode). For example, software applications responsible for trajectory validation and/or safety check may be disabled during the test mode. This may enable more granular control over vehicle actions during testing. In some cases, transitioning into the test mode may require terminating software applications that are not part of the reduced software application set associated with the test mode. Additionally, software applications that are common between the nominal mission mode and test mode may need to be restarted with different execution parameters (e.g., command line arguments). In some cases, transitioning out of the test mode may require restarting required software applications that are not in the reduced software application set associated with the test mode. In some cases, a full power cycle of the vehicle computing system may be required to trigger a transition from the test mode to the mission mode and/or vice versa.

In some cases, the system is configured to manage transitions between operational modes. In some cases, the system triggers a transition from a first operational mode to a second operational mode if at least one requirement for transition from the first operational mode to the second operational mode is satisfied. A transition requirement may be associated with one or more transition conditions. A transition condition associated with transitioning from a first to a second mode may be determined based on at least one of: (i) whether a request for transition from the first to the second mode is received (e.g., from a user, from a remote system, from a vehicle computing device, and/or the like), (ii) whether one or more safety conditions for transitioning from the first mode and/or to the second mode is satisfied (e.g., whether the vehicle is stopped before transitioning from a mission mode, whether a parking brake mechanism of the vehicle is disabled before transitioning from a mission mode, and/or the like), or (iii) whether a threshold amount of time and/or a threshold number of processing periods (e.g., ticks) has passed since transitioning to the first mode.

For example, in some cases, the system may determine that a transition requirement associated with transitioning from a mission mode to another mode is satisfied if both of the following transition conditions are satisfied: (i) a request for transitioning from the mission mode to the other mode is received, and (ii) the parking brake mechanism associated with the vehicle (e.g., an electronic parking brake (EPB) mechanism associated with the vehicle) is disabled (e.g., is clamped). As another example, in some cases, the system may determine that a transition requirement associated with transitioning from the initial mode to another mode if a request for transitioning from the initial mode is received. As another example, in some cases, the system the system may determine that a transition requirement associated with transitioning from the initial mode to a second mode (e.g., the mission mode) is satisfied if a threshold amount of time and/or a threshold number of processing periods (e.g., ticks) has passed since transitioning to the initial mode. This transition requirement may enable auto-transitioning from the initial mode after the passage of a threshold period of time from a time associated with boot-up and/or restart.

In some cases, a transition from a first operational mode to a second operational mode may be associated with two or more transition requirements. In some cases, given two or more transition requirements associated with transitioning from a first to a second mode, the system may trigger a transition from the first to the second mode based on determining that at least one of the two or more transition requirements is satisfied. For example, the system may trigger a transition from a first mode (e.g., the initial mode) to a second mode (e.g., the mission mode) if at least one of the following transition requirements is satisfied: (i) a request for transitioning from the first mode to the second mode is received, or (ii) a threshold amount of time and/or a threshold number of processing periods (e.g., ticks) has passed since transitioning to the first mode. As another example, the system may trigger a transition from a first mode (e.g., the mission mode) to a second mode (e.g., the charge mode, the operator mode, and/or the like) if at least one of the following transition requirements is satisfied: (i) a request for transitioning from the first mode to the second is received, or (ii) the vehicle is stopped and/or the velocity associated with the vehicle falls below a threshold.

In some cases, the system may be configured to enable transitioning from a first operational mode to a second operational mode based on determining that at least one transition requirement associated with the transition from the first to the second mode is satisfied. In some cases, enabling a transition from the first mode to the second mode includes performing a set of (e.g., a sequence of) transition operations. A transition operation may include at least one of: (i) updating an operational state associated with the vehicle to reflect the transition, the progress of the transition, and/or the completion of the transition, (ii) disabling one or more software applications associated with the first mode that are not associated with the second mode and are in a launched state, or (iii) enabling one or more software applications associated with the second mode that are not in a launched state.

In some cases, prior to initiating a transition operation, the system may need to verify that all necessary safety interlocks and/or preconditions are satisfied. This may include checking the status of critical vehicle components to ensure that those comments are in the appropriate states to allow the transition to proceed safely. In some cases, during a transition operation, software applications and vehicle components may need to be disabled and enabled in the correct sequence to prevent any conflicts and/or unsafe conditions. In some cases, if any step in the sequence fails, the transition may be safely aborted and/or the vehicle may be placed into a minimal risk condition until the issue leading to the failure is detected to be resolved.

In some cases, the system enables a transition from a first to a second operational mode based on a transition sequence associated with such a transition. A transition sequence may describe a sequence of transition operations to perform for transitioning from a first to a second mode. In some cases, each transition type from a first to a second mode may be associated with a respective transition sequence. For example, in some cases, after determining that a requirement for transitioning from a first to a second operational mode is satisfied, the system may: (i) first update the operational state associated with the vehicle to indicate that the vehicle is exiting the first mode, (ii) then disable any applications associated with the first mode that are not associated with the second mode (e.g., any applications inside the set of applications mapped to the first mode and outside of the set of applications assigned to the second mode) and are in a launched state, (iii) then update the operational state to indicate that the vehicle is entering the second mode, (iv) then enable any applications associated with the second mode (e.g., any applications inside the set of applications mapped to the second mode and outside of the set of applications assigned to the first mode) that are not in a launched state, and (v) then update the operational state to indicate that the vehicle has entered the second mode (e.g., is in a steady state with respect to the second mode).

In some cases, updating the operational states and/or notifying external component(s) about the operational state update(s) is performed periodically and at the termination of processing periods (e.g., ticks). For example, if the processing periods expire at a fixed interval of 10 milliseconds from a time T1, and if the system disables the application(s) associated with the first mode that are not associated with the second mode and are in a launched state at a time T1+5 milliseconds, then the system may update the operational state and/or notify external component(s) about the operational state update at the time T1+10 milliseconds (e.g., at the expiration of the current processing period, at the next processing "tick," and/or the like).

In some cases, a transition sequence associated with a transition from a first to a second operational mode may depend at least in part on how safety-critical software applications associated with the respective operational modes are. For example, in some cases, after determining that a requirement for transitioning from a first to a second operational mode is satisfied, the system may: (i) first update the operational state associated with the vehicle to indicate that the vehicle is exiting the first mode, (ii) then disable any non-safety-critical applications associated with the first mode that are not associated with the second mode and are in a launched state, (iii) then enable any applications associated with the second mode that are not in a launched state and are safety-critical, (iv) then update the operational state to indicate that the vehicle is entering the second mode, (v) then disable any safety-critical applications associated with the first mode that are not associated with the second mode and are in a launched state, and (vii) then update the operational state to indicate that the vehicle has entered the second mode (e.g., is in a steady state with respect to the second mode). In some cases, a safety-critical application is a software application whose launch group (e.g., as further described below) exceeds a threshold and/or falls within a threshold range.

In some cases, the techniques described herein include disabling execution (e.g., on hardware resource(s) associated with a low-level controller) of software application(s) that are not related to a vehicle's operational state and/or operational mode. In some cases, if a software application is not associated with the vehicle's operational state and/or operational mode, the system may disable the execution of the software application. Disabling the execution of a software application may include: (i) refraining from launching the software application (e.g., if the software application is not in a launched state), or (ii) terminating the execution of the software application (e.g., if the software application is in a launched state). In some cases, disabling the execution of a software application includes deallocating a network bandwidth associated with that software application and/or allocating the network bandwidth associated with that software application to another software application.

In some cases, a software application is associated with an executable file that can be executed by a processor to create a running instance of the software application. In some cases, refraining from launching the software application may include preventing the executable file from being executed by the processor. In some cases, terminating the execution of the software application may include stopping a running instance of the software application and/or unloading the executable file from memory.

In some cases, an executable file may be associated with two or more software applications. In some cases, the same executable file may be associated with a first software application when the file is executing using first data (e.g., a first set of execution parameters such as a first set of execution arguments) and a second set of software applications when the file is executing using second data (e.g., a second set of execution parameters such as a second set of execution arguments).

In some cases, each operational state and/or operational mode may be associated with a set of software applications that are designated for execution in that operational state and/or operational mode. For example, the mission mode may be associated with a first set of software applications related to a driving-related functionality. The first set may be associated with a perception software application for detecting objects based on sensor data, a prediction software application for predicting future trajectories of detected objects, a planning software application for planning a trajectory for the vehicle based on the predicted future positions of detected objects, and/or a control software application for generating control commands for the vehicle's actuators based on the planned trajectory. As another example, a charging mode may be associated with a different set of software applications related to charging functionality, such as a battery management software application for monitoring the vehicle's battery status and/or a charging control software application for controlling the vehicle's charging system.

In some cases, the system may maintain, for each operational state and/or operational mode, mapping data that specifies the set of software applications designated for execution in that operational state and/or operational mode. For example, in some cases, the system may maintain data representing a mapping table that maps each operational state and/or operational mode to a list of software application identifiers associated with the software applications associated with that operational state and/or operational mode. In some cases, when the vehicle transitions from a first operational state and/or operational mode to a second operational state and/or operational mode, the system may use this mapping data to determine which software applications should be enabled and which software applications should be disabled based on the transition. For example, if the vehicle transitions from a mission mode to a charging mode, the system may use the mapping data to determine that the software applications associated with driving functionality (e.g., the perception software application, the prediction software application, the planning software application, and/or the control software application) should be disabled, and that the software applications associated with charging functionality (e.g., the battery management software application and/or the charging control software application) should be enabled.

In some cases, disabling a software application may involve at least one of: (i) terminating any active instance(s) of the software application or (ii) preventing any future instances of the software application from launching (e.g., for as long as the vehicle remains in an unrelated operational mode). In some cases, to disable a software application, the system may determine whether there is a running instance of the software application. If there is a running instance of the software application, the system may terminate the running instance. If there is no running instance of the software application, the system may refrain from launching the software application. In some cases, the system may set a flag to indicate that the software application is disabled, such that if there is a future attempt to launch the software application (e.g., by another software), this attempted launch may be blocked.

In some cases, by disabling software applications that are not related to the vehicle's current operational state and/or operational mode, the system may conserve the limited hardware resources associated with a vehicle component (e.g., the vehicle's low-level controller). For example, by terminating running instances of software applications that are not related to a current operational state and/or operational mode, the system may be able to free up memory, processing, and/or other computing resources for use by the software applications that are related to the current operational state and/or operational mode. In some cases, by preventing unneeded software applications from launching, the system may be able to avoid using constrained computing resources on software applications that are not currently relevant to the vehicle's operation.

In some cases, the techniques described herein include determining that a first software application is operationally dependent on a second software application. In some cases, a first software application is operationally dependent on a second software application if: (i) the first software application is configured to access a service, function, and/or resource provided by the second software application, and/or (ii) the first software application is configured to receive and/or process data generated by the second software application. In some cases, a first software application is operationally dependent on a second software application if the first software application cannot perform a desired operation until the second software application is in a launched state. In some cases, a software application is in a launched state when the software application has been loaded into memory and/or is executing on a processor. In some cases, a software application is in a launched state when the software application has completed one or more required initialization routines and/or is ready to perform its intended function(s).

Accordingly, in some cases, a first software application may be operationally dependent on a second software application. For example, in some cases, a perception software application may be operationally dependent on a sensor driver software application, as the perception software application may need to rely on the sensor driver software application to provide sensor data that the perception software application uses to detect objects in the vehicle's environment.

As another example, in some cases, a planning software application may be operationally dependent on a prediction software application, as the planning software application may need to rely on the prediction software application to provide predicted trajectories of detected objects. The planning software application may use the predicted object trajectories to plan a trajectory for the vehicle that reduces the risk of collision with the predicted object trajectories.

As another example, in some cases, a steering control software application may be operationally dependent on a vehicle speed monitoring software application, as the steering control application may need to rely on the vehicle speed data provided by the monitoring application to adjust the steering responsiveness and/or steering limits based on the current speed of the vehicle.

As another example, in some cases, a braking control software application may be operationally dependent on a battery management software application. The braking control software application may need to rely on the current state of charge and/or temperature of the vehicle's battery system (e.g., as provided by the battery management application) to determine how much braking force can be safely applied without damaging the battery.

As another example, in some cases, a power management software application may be operationally dependent on software application(s) that report energy consumption statistics associated with one or more energy-consuming subsystems of the vehicle. The power management software application may determine the expected battery usage level (s) based on such reported statistics.

In some cases, the system may maintain operational dependency data associated with one or more software application operational dependencies. In some cases, the operational dependency data may represent at least one of: (i) that a first software application is operationally dependent on a second software application, or (ii) that all software application(s) operationally dependent on the second software application should be launched at least after a delay period from the second application's launch.

For example, the operational dependency data may represent a directed graph data structure. A node in this graph data structure may represent a software application. A directed edge from a first node to a second node may indicate that the software application associated with the first node is operationally dependent on the software application associated with the second node.

As another example, the operational dependency data may divide the software application(s) associated with an operational state (e.g., an operational mode) into a set of "launch groups." A launch group may represent a set of software applications that should only be launched after all software applications in any previous launch groups have already been launched. Software applications in the same launch group may be launched concurrently and/or in any order with respect to each other. In some cases, the launch groups may be sequentially ordered based on the operational dependencies between their software applications, such that a first application that is operationally dependent on a second software application is in a later launch group than the launch group including the second software application. For example, if the software applications associated with an operational mode include A1-A4, and if A1 is operationally dependent on A2 and A3, and A2 is operationally dependent on A4, then the first launch group may include A4, the second launch group may include A2 and A3, and the third launch group may include A1. This ordering of the three launch groups may ensure that A4 is launched before A2, A2 is launched before A1, and A3 is launched before A1.

In some cases, a first software application may be operationally dependent on a second software application in a first operational state, but not in a second operational state. Accordingly, in some cases, the operational dependency data associated with a first state may be different from the operational dependency data associated with a second state. In some cases, the operational dependency data may represent at least one of: (i) that a first software application is operationally dependent on a second software application while the vehicle is associated with a particular operational state, or (ii) that, while the vehicle is associated with the particular operational state, all software application(s) operationally dependent on the second software application should be launched at least after a delay period from the launch of the second software application.

In some cases, software applications in a launch group are launched sequentially. In some cases, when software applications in a particular launch group are launched sequentially, the launch of applications in the subsequent launch group is delayed by the sum of delays associated with the particular launch group. In some cases, software applications in a launch group are launched in parallel. In some cases, when software applications in a particular launch group are launched in parallel, the launch of applications in the subsequent launch group is delayed by the largest of launch delays associated with the applications in the particular launch group. For example, consider a launch group that includes a first application with a launch delay D1, a second application with a launch delay D2, and a third application with a launch delay D3, where D1>D2>D3. In some cases, D1-D3 may be launched sequentially, and the subsequent launch group may be launched after D1+D2+D3 from the beginning of the D1-D3 launch. In some cases, D1-D3 may be launched in parallel, and the subsequent launch group may be launched after D1 from the beginning of the D1-D3 launch.

In some cases, the operational dependency data may represent launch delay data associated with a software application. The launch delay data may represent a minimum delay period associated with the software application. The minimum delay period may represent a minimum period between the launch of the software application and any software application(s) that are operationally dependent on that software application. In some cases, the launch delay data associated with a software application may represent a predetermined value that specifies the minimum delay period for launching operationally dependent applications after the given application has been launched. This predetermined value may be based on factors such as the initialization period and/or the expected initialization period of the application, the expected time for the application to establish communication channel(s) with other application(s) (e.g., with a bus network, such as a controller area network (CAN) bus network, associated with the vehicle), and/or the like. For example, the launch delay data may represent that any operationally dependent application(s) should be launched at least 10 milliseconds after the corresponding application's launch. In some cases, the launch delay data associated with an application may represent that any operationally dependent application(s) may be launched immediately after the corresponding application's launch. In these cases, the minimum delay period may be set to zero.

In some cases, the launch delay data may represent a model for calculating a minimum delay period associated with a first software application based on current state and/or configuration(s) of the vehicle, the system, the first software application, and/or one or more second software applications that are operationally dependent on the first software application. For example, the minimum delay period associated with a first software application may be determined based on at least one of: (i) the current processing load and/or memory load of the system, (ii) the motion state of the vehicle (e.g., representing whether the vehicle is parked, driving, speeding up, slowing down, and/or the like), or (iii) the specific configuration(s) and/or operational state (e.g., operational mode) of the vehicle.

In some cases, the launch time of a first software application is determined based on the minimum delay periods associated with two or more second software applications on which the first software application operationally depends. In some cases, the launch time of a first software application is a latest allowed launch time as determined based on the maximum of the delay periods associated with two or more second software applications on which the first software application operationally depends. For example, if an application A1 operationally depends on an application A2 and an application A3, both A2 and A3 are launched at a time T1, A2 is associated with a minimum delay period of 10 milliseconds, and A3 is associated with a minimum delay period of 15 milliseconds, then the launch period for A1 may be on and/or after the time T1+15 milliseconds.

In some cases, the launch time of a first software application that is associated with an Mth launch group is determined based on the minimum delay periods associated with two or more second software applications associated with the (M−1)th launch group. In some cases, the launch time of a first software application associated with an Mth launch group is the latest allowed launch time as determined based on the maximum of the minimum delay periods associated with two or more second software applications associated with the (M−1)th launch group. For example, if an application A1 is associated with a first launch group, applications A2-A3 are associated with a second launch group, A2 and A3 are both associated with a launch time of T1, A2 is associated with a minimum delay period of 10 milliseconds, and A3 is associated with a minimum delay period of 15 milliseconds, then the launch time for A1 may be on and/or after the time T1+15 milliseconds. In some cases, each software application associated with an Mth launch group is designated as being operationally dependent on each software application associated with the (M−1)th group (e.g., where M>1).

Accordingly, in some cases (e.g., for M>1), the minimum delay period for each software application in an Mth launch group is determined based on the maximum required delay period associated with the software application(s) in the (M−1)th launch group. For example, if a first launch group includes the software application A1 with a minimum delay period of 10 milliseconds and a software application A2 with a minimum delay period of 15 seconds, a second launch group includes the software application B1 with a minimum delay period of 20 milliseconds and a software application B2 with a minimum delay period of 25 seconds, and a third launch group includes the software application C1 with a minimum delay period of 30 milliseconds and a software application C2 with a minimum delay period of 35 seconds, then: (i) the minimum delay period for launching the applications in the second group may be 15 milliseconds relative to the launch time of the applications in the first group, and (ii) the minimum delay period for launching the applications in the third group may be 25 milliseconds relative to the launch time of the applications in the second group. Therefore, in some cases, if the applications in first launch group start at time T1, the earliest time that the applications in second launch group may be launched may be on and/or after T1+15 milliseconds, and the earliest time that the applications in the third launch group may be launched is on and/or after T1+15 milliseconds+25 milliseconds=T1+40 milliseconds.

In some cases, the techniques described herein enable determining a launch arrangement for a set of software applications associated with the vehicle's operational state. The launch arrangement may represent at least one of: (i) a sequence of launches of the software applications in the set, or (ii) a timestamp for earliest permitted launch and/or for expected launch of a software application in the set. As described above, in some cases, an example system may use operational dependence data and/or launch delay data associated with a set of software applications (e.g., a set of software applications associated with the vehicle's current operational state) to determine an earliest launch time and/or a minimum launch delay period for each software application in the set. Therefore, in some cases, the system may determine a launch arrangement for the set of software applications based on the earliest launch times and/or minimum launch delay periods of the individual applications in the set.

For example, suppose a vehicle's operational state is associated with a set of five software applications A1-A5. The system may use the operational dependence data to determine that applications A1 and A2 are in the first launch group and associated with the minimum delay periods of 10 and 20 milliseconds respectively, while applications A3-A5 are in the second launch group. Based on this operational dependence data, the system may determine the following launch arrangement for the applications: (i) A1 and A2 launch immediately, and (ii) A3-A5 launch 20 milliseconds after the launch of A1 and A2. In this way, the system may generate a deterministic plan for launching the set of applications based on application dependencies and launch delay requirement(s). This may ensure that the applications are launched in a coordinated and reliable manner to avoid and/or reduce suboptimal application execution(s), bandwidth overload(s), and/or resource conflict(s).

Accordingly, in some cases, the techniques described herein include: (i) managing an operational state of a vehicle (e.g., by coordinating and/or restricting operational mode steady states and/or transitions), (ii) disabling execution of software application(s) in unrelated operational states, and/or (iii) determining an arrangement for launching a set of software applications (e.g., a set of software applications associated with a vehicle's current operational state) based on operational dependencies and/or minimum launch delay periods. In some cases, at least one of the noted operations may be performed by a supervisor software application, such as a supervisor software application executing on a target vehicle component (e.g., a low-level controller of a vehicle).

The supervisor software application may be launched as part of the target vehicle component's bootup and/or restart process. The supervisor software application may be configured to be executed by the target vehicle component in the background to ensure that the supervisor software application has the requisite access to perform operational state management, software application execution management, and/or software application launch management with respect to the target vehicle component. In some cases, the supervisor software application is part of the target vehicle component's firmware. In some cases, the supervisor software application is part of the target vehicle component's operating system and/or is executed by the operating system as a core software application. The target vehicle component's operating system may be an operating system configured for use in embedded systems.

In some cases, the techniques described herein enhance the safety and/or reliability of a vehicle computing device. As described above, in some cases, the techniques described herein enable more optimal execution of software applications associated with a vehicle's low-level controller and/or wider usage of the low-level controller's computing resources by software applications associated with the vehicle. Both techniques enhance the safety and/or reliability of a vehicle computing device.

For example, in some cases, by enabling more optimal execution of software applications associated with a vehicle's low-level controller, the techniques described herein reduce the likelihood that suboptimal and/or error-prone execution of such software applications threatens safety and/or reliability of the vehicle computing device. As another example, in some cases, by enabling wider usage of the low-level controller's computing resources by software applications associated with the vehicle, the techniques described herein enable wider execution of vehicle-related software applications using automotive-grade and/or safety-critical hardware, which may enhance the safety and/or reliability of a vehicle computing device. Accordingly, in some cases, the techniques described herein reduce the likelihood that a vehicle computing device operates in an unsafe, unreliable, and/or error-prone manner. In this way, the techniques described herein enhance vehicle safety and/or reliability.

The techniques described herein can be implemented in a number of ways. Example implementations are provided below with reference to the following figures. Although discussed in the context of an autonomous vehicle, the techniques described herein can be applied to a variety of complex systems and is not limited to autonomous vehicles. For instance, the systems, methods, and apparatuses can be used in an aviation or in a nautical context to analyze aircraft or vessel responses to simulated faults and determine whether the aircraft or vessel performed its intended operations in response to the fault.

FIG. 1 depicts an environment 100 for supervised execution of software applications on a set of vehicle computing devices 102. The vehicle computing device(s) 102 may be examples of vehicle computing device(s) 604 described below with reference to FIG. 6.

As depicted in FIG. 1, the vehicle computing device(s) 102 include a first computing unit 104 with a processor 104A and a memory 104B, as well as a second computing unit 106 with a processor 106A and a memory 106B. The processor 104A and/or the processor 106A may be examples of processor(s) 616 described below with reference to FIG. 6. The memory 104B and/or the memory 106B may be examples of memory 618 described below with reference to FIG. 6. As used herein, the term memory may include a short-term memory (e.g., a random-access memory) and/or a persistent storage device (e.g., a hard disk device).

In some cases, the first computing unit 104 is a low-level controller as described above, while the second computing unit 106 is a high-level controller as described above. In some cases, at least one of the processor 104A or the memory 104B is safety-critical and/or automotive-grade. In some cases, at least one of the processor 106A or the memory 106B is non-safety-critical and/or non-automotive-grade.

In some cases, the first computing unit 104 is configured to control drive system(s) 110, emitter(s) 112, and/or other vehicle physical component(s) 114. The drive system(s) 110 and the emitter(s) 112 may be examples of drive system(s) 614 and emitter(s) 608 described below with reference to FIG. 6, respectively. Examples of other vehicle physical component(s) 114 include HVAC devices, power sources, display devices, audio output components, haptic output components, and/or the like.

As depicted in FIG. 1, the first computing unit 104 communicates using one or more network interface(s) 108. The network interface(s) 108 may be the network interface(s) 610 described below with reference to FIG. 6. The network interface(s) 108 may, for example, enable the first computing unit 104 to (e.g., during a remote operational mode) receive remote control operations for controlling a corresponding vehicle from a remote operator 116 (e.g., a teleoperator).

The first computing unit 104 may be configured to receive output data generated by the second computing unit 106 and/or translate such output data to commands configured to control the drive system(s) 110, the emitter(s) 112, and/or the other vehicle physical component(s) 114. For example, the second computing unit 106 may be configured to provide a trajectory for controlling the vehicle, and the first computing unit 104 may provide commands determined based on that trajectory to the drive system(s) 110, the emitter(s) 112, and/or the other vehicle physical component(s) 114. As another example, the second computing unit 106 may be configured to provide an indication of an object detected by the first computing unit 104 using a display device of the vehicle.

The first computing unit 104 may store configuration data for and/or execute a set of software applications, including a supervisor 104B1, a drive manager 104B2, a body manager 104B3, and/or a power manager 104B4. However, a person of ordinary skill in the relevant art will recognize that the first computing unit 104 may execute other sets of software applications in addition to and/or instead of the set depicted in FIG. 1. At least one of the drive manager 104B2, the body manager 104B3, and/or the power manager 104B4 is an example of a system controller. Such system controllers may be examples of system controllers 626 described below with reference to FIG. 6.

In some cases, the drive manager 104B2 is configured to control the drive system(s) 110 based on output data (e.g., trajectories) generated by the second computing unit 106. The drive manager 104B2 may translate the output data into low-level commands that may be executed by the drive system(s) 110 to control the vehicle's driving functions (e.g., motion, steering, braking, and/or the like).

The body manager 104B3 may be configured to control one or more body-related functions of the vehicle, such as functions related to the HVAC system, lighting system, doors, windows, and/or the like. The body manager 104B3 may receive high-level commands from the second computing unit 106 and/or other sources. The body manager 104B3 may be configured to translate these high-level commands into low-level commands that can be executed by the relevant physical component(s) of the vehicle.

The power manager 104B4 may be configured to manage one or more power systems of the vehicle. For example, the power manager 104B4 may be configured to manage charging of the power source(s) of the vehicle. As another example, the power manager 104B4 may be configured to manage (e.g., control and/or monitor) power distribution to one or more components of the vehicle.

The supervisor 104B1 may be configured to manage execution of a set of software applications (e.g., the drive manager 104B2, the body manager 104B3, and the power manager 104B4) on the computing resources associated with the first computing unit 104 (e.g., using the processor 104A and/or the memory 104B). For example, the supervisor 104B1 may be configured to manage execution of the set of software applications based on the current operational mode of the vehicle. As another example, the supervisor 104B1 may be configured to manage the vehicle's operational state (e.g., to determine which operational mode the vehicle is in and/or to determine when to enable transitions between operational modes). As another example, the supervisor 104B1 may be configured to determine a launch arrangement for a set of software applications (e.g., a set of software applications that are permitted to be executed during a current operational state), for example based on operational dependency relationships between software applications and/or based on required minimum launch delay periods associated with software applications.

In some cases, the supervisor 104B1 may manage execution of a set of software applications (e.g., the drive manager 104B2, the body manager 104B3, and the power manager 104B4) on the computing resources of the first computing unit 104 based on supervisor configuration data 104B5 stored on the memory 104B. The supervisor configuration data 104B5 may define: (i) mappings of software application sets to operational modes, (ii) transition requirements for transitions between operational modes, and/or (iii) operational dependency relationships and/or minimum launch delay periods associated with software applications. Examples of supervisor configuration data 104B5 are described below with reference to FIG. 2.

The second computing unit 106 may be configured to perform high-level processing (e.g., machine learning) tasks, such as localization, mapping, perception, prediction, and/or planning, based on data received from the first computing unit 104, from one or more vehicle components, and/or from one or more vehicle sensor(s). The second computing unit 106 may generate object detections, object trajectory predictions, and/or trajectories that are transmitted to the first computing unit 104 for controlling the drive system(s) 110 and/or other vehicle physical component(s) 114.

In some cases, the second computing unit 106 may be configured to store configuration data for and/or execute a set of software applications, including a localization component 106B1, a perception component 106B2, a prediction component 106B3, and/or a planning component 106B4. The localization component 106B1, the perception component 106B2, the prediction component 106B3, and the planning component 106B4 may be examples of the localization component 620, the perception component 622, the prediction component 628, and the planning component 630 depicted in FIG. 6.

Figure 2:
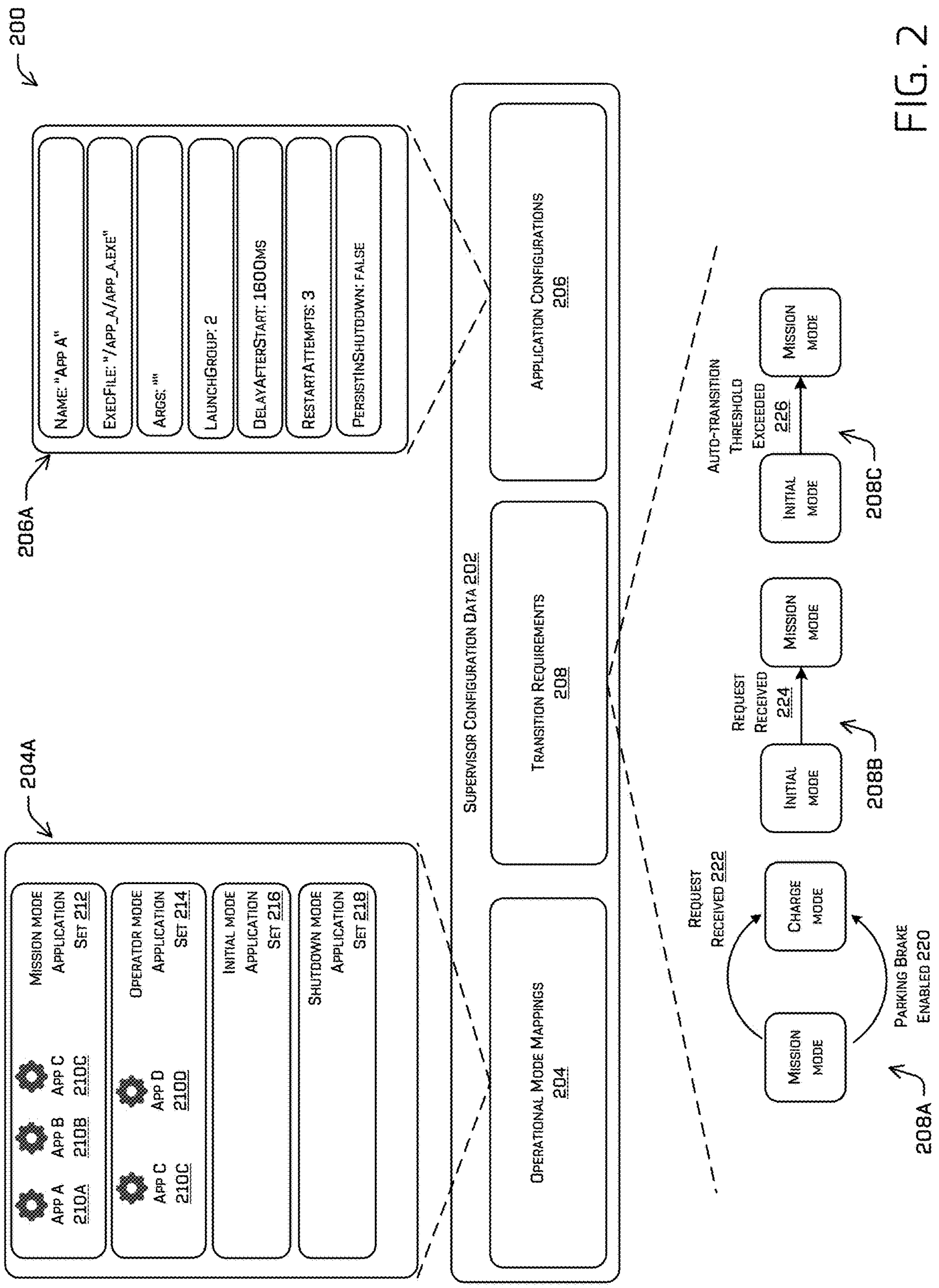
FIG. 2 provides an operational example of supervisor configuration data associated with a supervisor software application executing on a vehicle computing device.

FIG. 2 provides an operational example 200 of supervisor configuration data 202 associated with a supervisor software application executing on a vehicle computing device (e.g., on a low-level controller of a vehicle). As depicted in FIG. 2, the supervisor configuration data 202 includes a set of operational data mappings 204, a set of application configurations 206, and a set of mode transition requirements 208.

The operational data mappings 204 may include, for each operational mode associated with a corresponding vehicle, a set of mapped software applications. In some cases, a supervisor (e.g., the supervisor 104B1 of FIG. 1) may be configured to disable execution of a software application on particular computing resource(s) (e.g., on computing resource(s) associated with the first computing unit 104 of FIG. 1) if the software application is not mapped to the vehicle's current operational mode.

As depicted in FIG. 2, the example operational data mappings 204A include: (i) a mapping of the mission mode to a mission mode application set 212 including an Application A 210A, an Application B 210B, and an Application C 210C, (ii) a mapping of the operator mode to an operator mode application set 214 including the Application C 210C and an Application D 210D, (iii) a mapping of the initial mode to an initial mode application set 216 which is an empty set (e.g., indicating that no software applications are mapped to the initial mode), and (iv) a mapping of the shutdown mode to a shutdown mode application set 218 which is an empty set (e.g., indicating that no software applications are mapped to the shutdown mode).

The mission mode, the operator mode, the initial mode, and the shutdown mode are described in greater detail above. While the example implementation depicted in FIG. 2 includes the mission mode, the operator mode, the initial mode, and the shutdown mode, a person of ordinary skill in the relevant technology will recognize that other implementations may include operational modes in addition to and/or instead of at least one of the mission mode, the operator mode, the initial mode, or the shutdown mode.

The application configurations 206 may include, for each software application that is configured to be executed on particular computing resource(s) (e.g., on computing resource(s) associated with the first computing unit 104 of FIG. 1), one or more configuration values that define when and/or how the software application should be executed. In some cases, a supervisor (e.g., the supervisor 104B1 of FIG. 1) may be configured to control execution of the software applications based on the application configurations 206 (e.g., based on an execution arrangement determined based on the application configurations 206).

Examples of configuration values include a configuration value representing the executable file associated with the corresponding software application, a configuration value representing any execution parameters (e.g., arguments) associated with the corresponding software application, a configuration value representing a launch group associated with the corresponding software application, a configuration value representing a minimum delay launch period associated with the corresponding software application, a configuration value representing a permissible number of unsuccessful relaunches before determining that launch of the corresponding software application has failed, and a configuration value representing whether the corresponding software application should be disabled in a shutdown mode.

For example, as depicted in FIG. 2, the example application configuration 206A describes: (i) using the Name field, that the application configuration 206A is associated with the software application named "App A," (ii) using the ExecFile field, that the application configuration 206A is associated with the executable file at the location "/app_a/app_a.exe," (iii) using the Args field, that the application configuration 206A is associated with no execution parameters, (iv) using the LaunchGroup field, that the application configuration 206A is associated with a second launch group, (v) using the DelayAfterStart field, that the launch of any software applications in the third launch group should be delayed by at least 1600 milliseconds, (vi) using the RestartAttempts field, that launch of the corresponding software application is stopped after three unsuccessful relaunches, and (vii) using the PersistInShutdown field, that the corresponding software application should not be executing in the shutdown mode.

The transition requirements 208 may include, for each transition from one operational mode to another operational mode, a set of transition requirements. A transition requirement may include a set of one or more conditions that, if satisfied, cause triggering of transition operations associated with an operational mode transition. In some cases, a supervisor (e.g., the supervisor 104B1 of FIG. 1) may be configured to control transitions between the operational modes associated with a vehicle computing device based on the transition requirements 208.

For example, as depicted in FIG. 2 and based on the transition requirement 208A, the supervisor may trigger a transition from a mission mode to a charge mode based on satisfaction of: (i) a transition condition 220 requiring enabling (e.g., clamping) of the vehicle parking brake, and (ii) a transition condition 222 requiring receiving a request to transition from the mission mode to the charge mode. Furthermore, based on the transition requirement 208B, the supervisor may trigger a transition mode from an initial mode to the mission mode based on satisfaction of a transition condition 224, which requires receiving a request to transition from the initial mode to the mission mode. Moreover, based on the transition requirement 208C, the supervisor may trigger a transition mode from an initial mode to the mission mode based on satisfaction of a transition condition 226, which requires that an auto-transition threshold is exceeded. The auto-transition threshold may refer to a threshold value for transitioning from the initial mode to a defined subsequent mode, such as to the mission mode. For example, in some cases, the supervisor may determine that the transition condition 226 is satisfied if a threshold amount of time and/or a threshold number of processing periods (e.g., ticks) has passed since transitioning to the initial mode.

Figure 3:
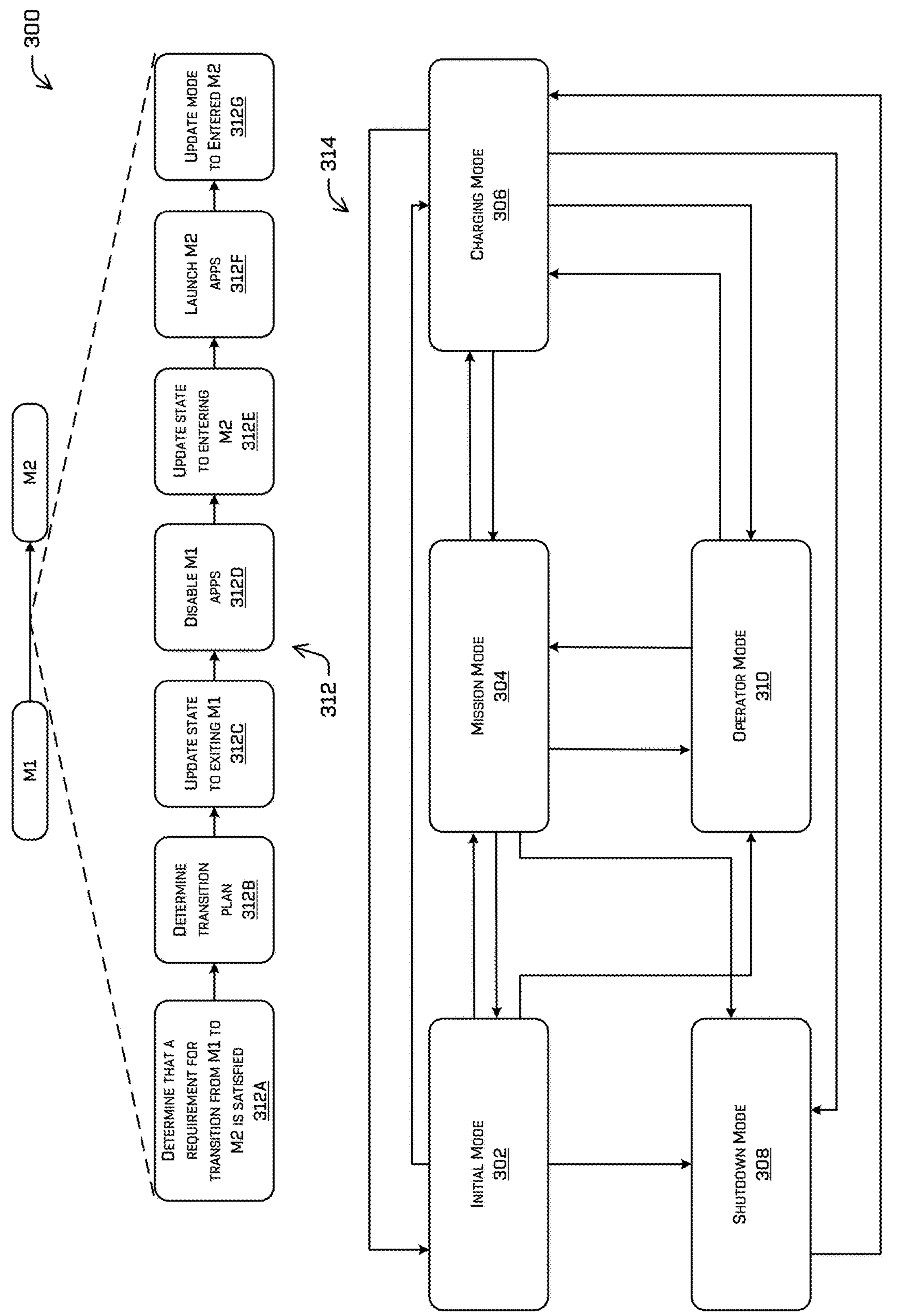
FIG. 3 provides an operational example of a set of operational mode transitions.

FIG. 3 provides an operational example 300 of a set of operational mode transitions. Specifically, in FIG. 3, each directed edge of the graph 314 may represent a permitted transition from one operational mode to another operational mode. Such a transition may be triggered by determining that at least one requirement for that transaction is satisfied. For example, as depicted in FIG. 3, the directed edge from the mission mode 304 to the operator mode 310 may represent a transition from the mission mode 304 to the operator mode 310 based on determining that a transition requirement associated with such a transition is satisfied.

As depicted in FIG. 3, the graph 314 depicts the potential transitions between five operational modes: an initial mode 302, a mission mode 304, a charging mode 306, a shutdown mode 308, and an operator mode 310. The mission mode, the operator mode, the initial mode, and the shutdown mode are described in greater detail above. While the example implementation depicted in FIG. 3 includes the mission mode, the operator mode, the initial mode, and the shutdown mode, a person of ordinary skill in the relevant technology will recognize that other implementations may include operational modes in addition to and/or instead of at least one of the mission mode, the operator mode, the initial mode, or the shutdown mode.

As further depicted in FIG. 3, an example transition from an operation mode M1 to an operation mode M2 may include the process 312, which includes operations 312A-312G. At operation 312A, an example system (e.g., the supervisor 104B1 of FIG. 1) determines that a transition requirement for transitioning from M1 to M2 is satisfied. Examples of transition requirements are described above.

At operation 312B, the system determines a transition plan. The system may determine the transition plan based on operational dependence data and/or software application mapping data. The transition plan may represent which software applications need to be launch and/or disabled to perform the transition. The transition plan may also represent which sets of software application launches and/or disablements need to be performed before other software application launches and/or disablements. For example, the transition plan may require the disabling of those software applications that are associated with M1 but not M2, followed by launching of those software applications that are associated with M2 but not M1.

At operation 312C, the system updates the operational state associated with the vehicle to represent that the vehicle is exiting M1. In some cases, the system updates the operational state at the expiration of a processing period associated with at least one of operation 312A, operation 312B, or operation 312C.

At operation 312D, the system determines at least a subset of software applications associated with M1. For example, the system may disable those software applications that are associated with M1 but not M2.

At operation 312E, the system updates the operational state associated with the vehicle to represent that the vehicle is entering M2. In some cases, the system updates the operational state at the expiration of a processing period associated with at least one of operation 312D or operation 312E.

At operation 312F, the system launches at least a subset of software applications associated with M2. For example, the system may launch those software applications that are associated with M2 but not M1.

At operation 312G, the system updates the operational associated with the vehicle to represent that the vehicle is in M2 (e.g., is in a steady state associated with M2). In some cases, the system updates the operational state at the expiration of a processing period associated with at least one of operation 312F or operation 312G.

Figure 4:
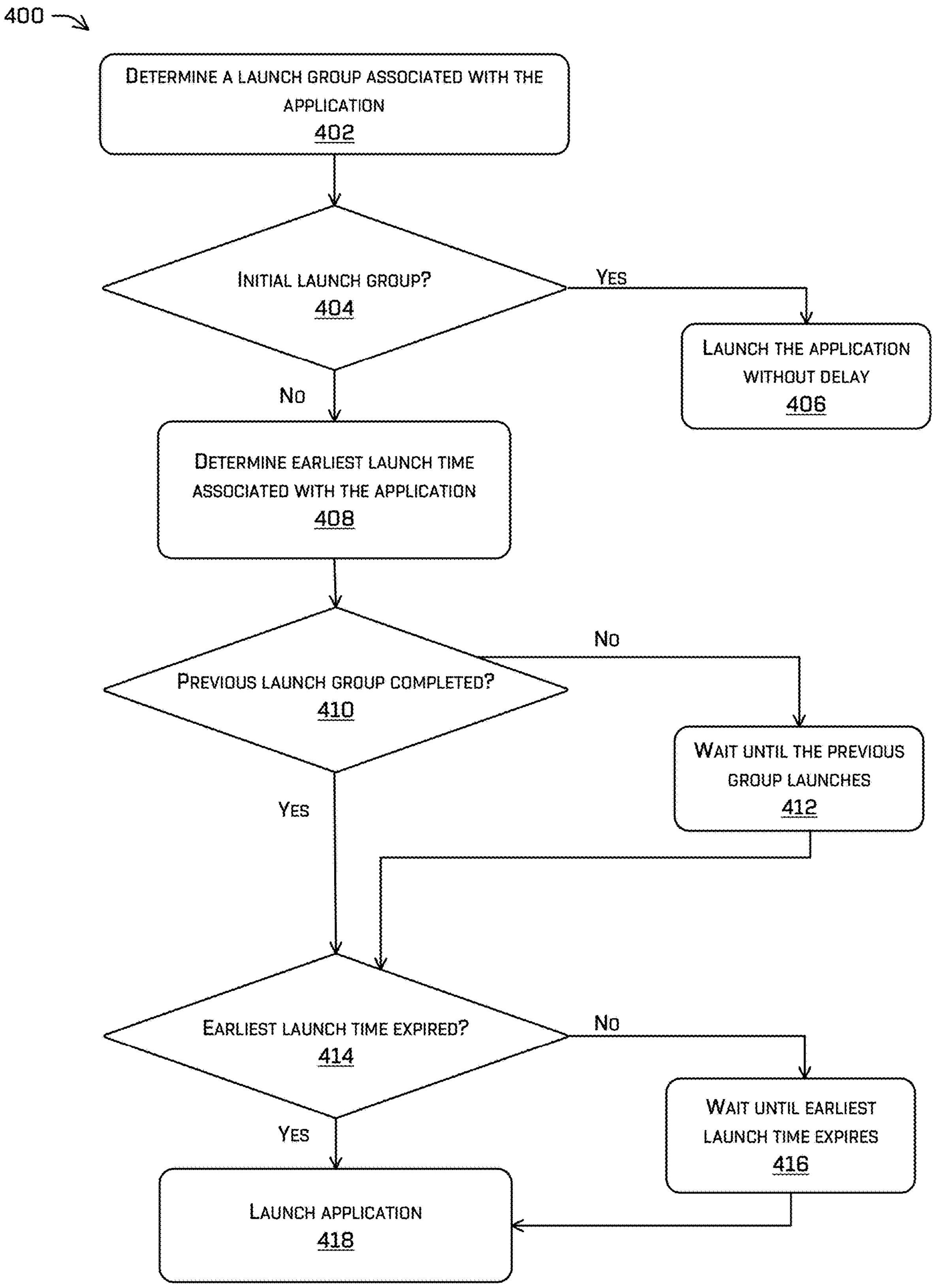
FIG. 4 is a flowchart diagram of an example process for coordinated launch of a set of software applications.

FIG. 4 is a flowchart diagram of an example process 400 for coordinated launch of a set of software applications (e.g., a set of software applications that are associated with a vehicle's common operational mode). As depicted in FIG. 4, at operation 402, an example system (e.g., the supervisor 104B1 of FIG. 1) determines a launch group associated with a first software application. Examples of software application launch groups are described above. As described above, in some cases, a launch group represents a set of software applications that should all be launched before the launch of those software applications in a subsequent (e.g., lower order) lunch group. For example, in some cases, all of the software applications in the first launch group should be launched before launching of the software applications in the second launch group, all of the software applications in the second launch group should be launched before launching of the software applications in the third launch group, and so on.

At operation 404, the system determines whether the determined launch group is the first (e.g., lowest order) launch group. If the system determines that the determined launch group is the first launch group (operation 404—Yes), the system proceeds to operation 406 to launch the software application without any launch delays.

However, if the system determines that the determined launch group is not the first launch group (operation 406—No), the system proceeds to operation 408 to determine an earliest launch time associated with the first software application. The earliest launch time may be an earliest time at which the first software application is permitted to be launched. The earliest launch time may be determined based on a maximum delay period associated with the software application(s) in a preceding launch group, as described above.

At operation 410, the system determines whether all of the software applications in a preceding launch group have successfully launched. In some cases, if the determined launch group is M, the system determines whether all of the software applications in the (M−1)th group have successfully launched.

If the system determines that at least one of the software applications in the preceding launch group has not successfully launched (operation 410—No), the system proceeds to operation 412 to wait until all of the software applications in the preceding launch group have successfully launched. After the system determines that all of the software applications in the preceding launch group have successfully launched, the system may proceed to operation 414.

However, if the system determines that all of the software applications in the preceding launch group have successfully launched (operation 410—Yes), the system may proceed to operation 414 to determine whether the earliest launch time determined at operation 408 has expired (e.g., has been reached and/or has been passed). If the system determines that the earliest launch time has not expired (414—No), the system proceeds to operation 416 to wait until the earliest launch time has expired and then proceeds to operation 418. However, if the system determines that the earliest launch time has expired (414—Yes), the system proceeds to operation 418 to launch the software application.

Figure 5:
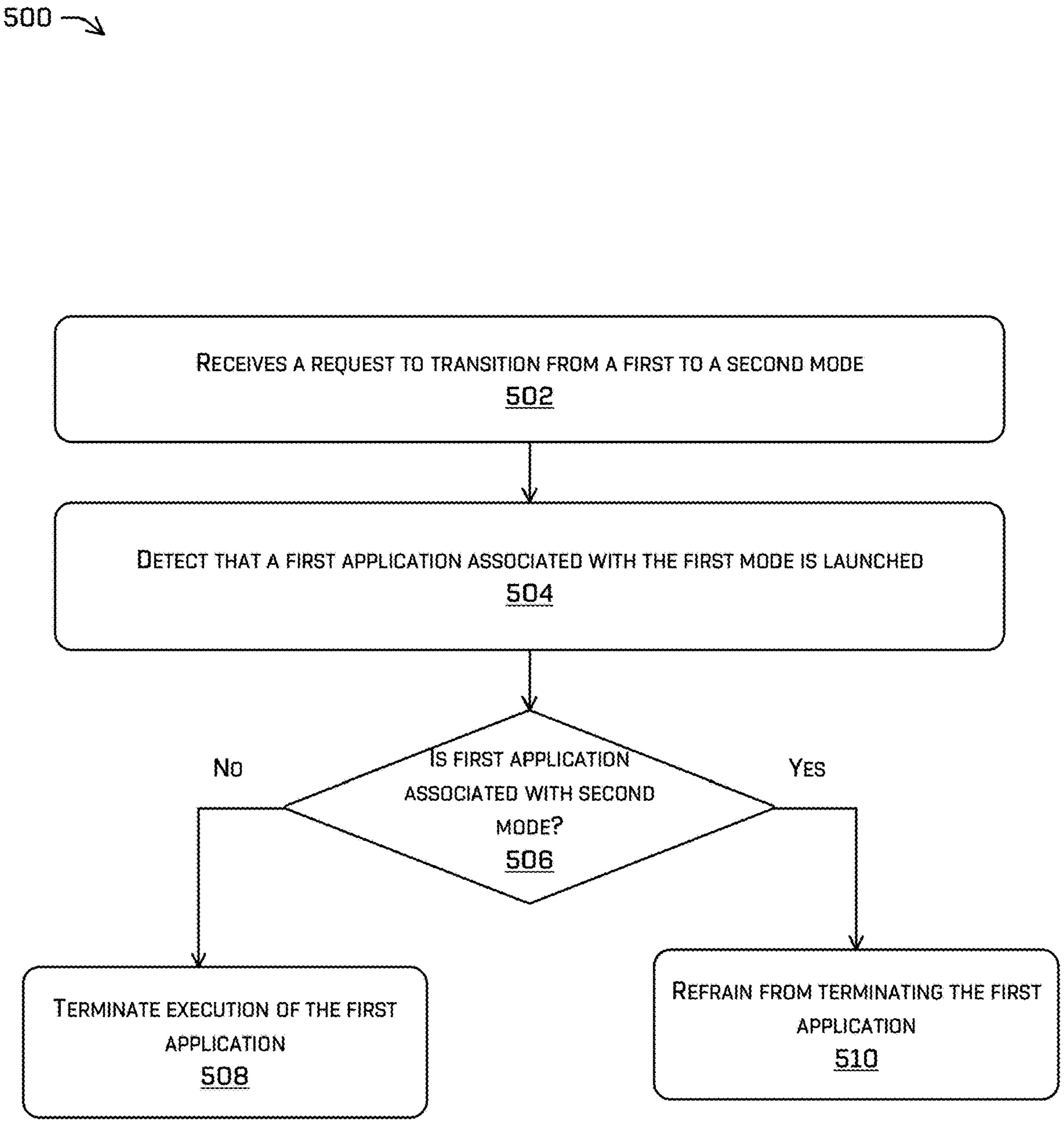
FIG. 5 is a flowchart diagram of an example process for managing execution of a first software application associated with a first operational mode based on receiving a request to transition from the first operational mode.

FIG. 5 is a flowchart diagram of an example process 500 for managing execution of a first software application associated with a first operational mode based on receiving a request to transition from the first operational mode. At operation 502, an example system (e.g., the supervisor 104B1 of FIG. 1) receives a request to transition from the first operational mode to a second operational mode. The request may be provided by a user, a remote system, and/or a component of the vehicle computing device(s) (e.g., a component of the vehicle's high-level controller).

At operation 504, the system detects that the first software application associated with the first operational mode is in a launched state. In some cases, the system may have set the state of the first application to represent the launched state based on recording a previous launch of the first application.

At operation 506, the system determines (e.g., based on configuration data mapping operational modes to permitted software applications) whether the first software application is also associated with the second operational mode. If the system determines that the first software application is not associated with the second operational mode (operation 506—No), the system proceeds to operation 508 to terminate and/or halt execution of the first software application. However, if the system determines that the first software application is associated with the second operational mode (operation 506—Yes), the system proceeds to operation 510 to refrain from terminating and/or halting the first application (e.g., to maintain execution of the first application).

Figure 6:
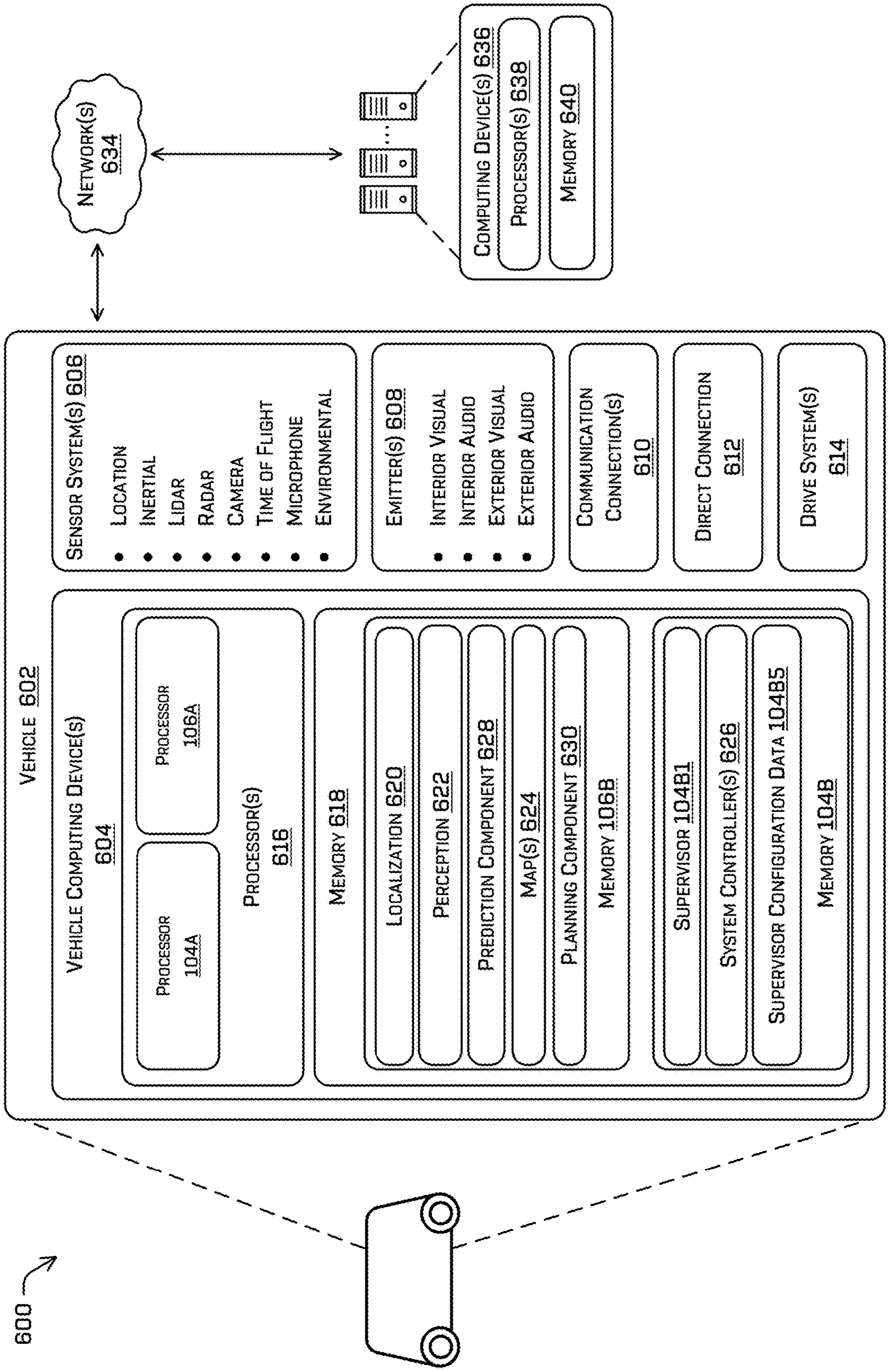
FIG. 6 is associated with a block diagram of an example system for implementing various techniques described herein.

FIG. 6 is associated with a block diagram of an example system 600 for implementing various techniques described herein. In some instances, the example system 600 may include a vehicle 602. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 602 can be configured to perform various techniques described herein, including detecting sensor data inconsistencies by comparing the sensor data in overlapping regions captured by different sensors. The vehicle 602 also may be configured to determine causes of sensor data inaccuracies and/or responses by the vehicle 602 to the sensor data inaccuracies, using the various techniques described herein.

The vehicle 602 may include vehicle computing device(s) 604, sensor(s) 606, emitter(s) 608, network interface(s) 610, at least one direct connection 612 (e.g., for physically coupling with the vehicle to exchange data and/or to provide power), and one or more drive system(s) 614. The system 600 may additionally or alternatively comprise vehicle computing device(s) 604.

In some instances, the sensor(s) 606 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 636.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns, and/or the like) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). For instance, the network interface(s) 610 may facilitate communication with other local computing device(s) on the vehicle 602 and/or the drive systems(s) 614. Also, the network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 636. In some examples, computing device(s) 636 may comprise one or more nodes of a distributed computing system (e.g., a cloud computing architecture).

The network interface(s) 610 may include physical and/or logical interfaces for connecting the vehicle computing device(s) 604 to another computing device or a network, such as network(s) 634. For example, the network interface(s) 610 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 604 and/or the sensor(s) 606 may send sensor data, via the network(s) 634, to the computing device(s) 636 at a particular frequency, after a lapse of a predetermined period of time, in near real-time, etc.

In some instances, the vehicle 602 may include one or more drive systems(s) 614 (or drive components). In some instances, the vehicle 602 may have a single drive system 614. In some instances, the drive system(s) 614 may include one or more sensors to detect conditions of the drive system(s) 614 and/or the surroundings of the vehicle 602. By way of example and not limitation, the sensor(s) of the drive systems(s) 614 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 614. In some cases, the sensor(s) on the drive systems(s) 614 may overlap or supplement corresponding systems of the vehicle 602 (e.g., sensor(s) 606).

The drive systems(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 614 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 614. Furthermore, the drive systems(s) 614 may also include one or more network interface(s) that enable communication by the respective drive component with one or more other local or remote computing device(s).

The vehicle computing device(s) 604 may include processor(s) 616 and memory 618 communicatively coupled with the one or more processors 616. Computing device(s) 636 may also include processor(s) 638, and/or memory 640.

The processor(s) 616 and/or 638 may be any suitable processor capable of executing computer-executable instructions to process data and perform operations as described herein. By way of example and not limitation, the processor(s) 616 and/or 638 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 618 and/or 640 may be examples of non-transitory computer-readable media. The memory 618 and/or 640 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and/or memory 640 may store a localization component 620, perception component 622, maps 624, system controller(s) 626, prediction component 628, and/or planning component 630.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include map(s) of an environment and can continuously determine a location, velocity, and/or orientation of the autonomous vehicle within the map(s). In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the planning component 630 and/or to the prediction component 628, a location and/or orientation of the vehicle 602 relative to the environment and/or sensor data associated therewith.

The memory 618 can further include one or more maps 624 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 624 may include at least one map (e.g., images and/or a mesh) generated in accordance with the techniques discussed herein. In some examples, the vehicle 602 can be controlled based at least in part on the maps 624. That is, the maps 624 can be used in connection with the localization component 620, the perception component 622, and/or the planning component 630 to determine a location of the vehicle 602, identify objects in an environment, and/or generate routes and/or trajectories to navigate within an environment.

In some instances, the perception component 622 may comprise a primary perception system and/or a prediction system implemented in hardware and/or software. The perception component 622 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 622 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 628 may include functionality to generate predicted information associated with objects in an environment. As an example, the prediction component 628 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 602 traverses an environment. In some examples, the prediction component 628 can generate one or more predicted positions, predicted velocities, predicted trajectories, etc., for such target objects based on attributes of the target object and/or other objects proximate the target object.

The planning component 630 may receive a location and/or orientation of the vehicle 602 from the localization component 620, perception data from the perception component 622, and/or predicted trajectories from the prediction component 628, and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 626 and/or drive systems(s) 614 may parse/cause to be carried out, second instructions for the emitter(s) 608 may be formatted according to a second format associated therewith). In at least one example, the planning component 630 may comprise a nominal trajectory generation subcomponent that generates a set of candidate trajectories, and selects a trajectory for implementation by the drive systems(s) 614 based at least in part on determining a cost associated with a trajectory according to U.S. patent application Ser. No. 16/517,506, filed Jul. 19, 2019 and/or U.S. patent application Ser. No. 16/862,284, filed May 11, 2020, the entirety of which are incorporated herein by reference for all purposes.

The memory 618 and/or 640 may additionally or alternatively store a mapping system (e.g., generating a map based at least in part on sensor data), a planning system, a ride management system, etc. Although localization component 620, perception component 622, the prediction component 628, the planning component 630, and/or system controller(s) 626 are illustrated as being stored in memory 618, any of these components may include processor-executable instructions, machine-learned model(s) (e.g., a neural network), and/or hardware and all or part of any of these components may be stored on memory 640 or configured as part of computing device(s) 636.

As described herein, the localization component 620, the perception component 622, the prediction component 628, the planning component 630, and/or other components of the system 600 may comprise one or more ML models. For example, the localization component 620, the perception component 622, the prediction component 628, and/or the planning component 630 may each comprise different ML model pipelines. The prediction component 628 may use a different ML model or a combination of different ML models in different circumstances. For example, the prediction component 628 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 618 may additionally or alternatively store one or more system controller(s) 626, which may be configured to control steering, propulsion, braking, safety, emitters, communication, and other systems of the vehicle 602. These system controller(s) 626 may communicate with and/or control corresponding systems of the drive systems(s) 614 and/or other components of the vehicle 602.

In an additional or alternate example, vehicle 602 and/or computing device(s) 636 may communicate (e.g., transmit and/or receive messages over network(s) 634) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 602. For example, the passenger device may additionally or alternatively comprise a display and/or one or more input/output devices, such as a touchscreen, microphone, speaker, and/or the like. In some examples, the vehicle 602 may transmit messages and/or receive messages from the passenger device.

As depicted in FIG. 6, the processor(s) 616 include processor 104A and processor 106A of FIG. 1. However, a person of ordinary skill in the relevant technology will recognize that the processor(s) 616 may include processing units other than and/or in addition to the processor 104A and/or processor 106A of FIG. 1.

As depicted in FIG. 6, the memory 106B of FIG. 1 includes localization component 620, perception component 622, maps 624, prediction component 628, and/or planning component 630, while processor 106A of FIG. 1 includes the supervisor 104B1, the system controllers 626, and supervisor configuration data 104B5. However, a person of ordinary skill in the relevant technology will recognize that other arrangements and/or architecture of the vehicle computing device(s) and/or the memory 618 are possible.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: A system comprising: one or more processors; and one or more non-transitory computer-readable media storing computer-executable instructions that, when executed, cause the one or more processors to perform operations comprising: at a first time, receiving a first request to operate a vehicle in a first operational mode; determining that the first operational mode is associated with a first set of software applications comprising a first software application and a second software application, wherein at least one of the first software application or the second software application is associated with controlling the vehicle based at least in part on a trajectory that is determined by a vehicle computing device; based on determining that a third software application is outside the first set, at least one of: stopping execution of the third software application, or refraining from initiating execution of the third software application; determining that the second software application is operationally dependent on the first software application; based at least in part on receiving the first request, initiating execution of the first software application; based at least in part on determining that the second software application is operationally dependent on the first software application, initiating execution of the second software application based at least in part on a delay period; at a second time, receiving a second request to operate the vehicle in a second operational mode; determining that the second operational mode is associated with a second set of software applications comprising the third software application; and based at least in part on receiving the second request and determining that the at least one of the first software application or the second software application are outside of the second set, stopping execution of at least one of the first software application or the second software application; and initiating execution of a third software application associated with the second operational mode.

B: The system of paragraph A, wherein the second operational mode is associated with at least one of: control of the vehicle, charging of the vehicle, at least one of deploying or updating at least one software application associated with the vehicle, shutting down the system, or operating the vehicle with reduced power usage.

C: The system of paragraph A or B, wherein at least one of the first software application or the second software application is associated with at least one of: a first machine-learned model configured to process sensor data associated with the vehicle to detect an object in an environment of the vehicle, a second machine-learned model configured to determine a predicted trajectory for the object, or a third machine-learned model configured to determine the trajectory based at least in part on the predicted trajectory.

D: The system of any of paragraphs A-C, wherein: the vehicle is associated with a set of software applications comprising the first software application, the second software application, and the third software application, and the operations comprise, during a period associated with the first operational mode, at least one of preventing or stopping execution of a fourth software application that is in the set of software applications and outside of the first set.

E: The system of any of paragraphs A-D, wherein: the second operational mode is associated with charging the vehicle; and the operations comprise at least one of preventing or stopping execution of a fourth software application that performs a task unrelated to charging the vehicle.

F: One or more non-transitory computer-readable media storing instructions executable by one or more processors, wherein the instructions, when executed, cause the one or more processors to perform operations comprising: at a first time, receiving a first request to operate a vehicle in a first operational mode; determining that the first operational mode is associated with a first set of software applications comprising a first software application; based at least in part on receiving the first request, initiating execution of the first software application; based at least in part on receiving the first request and determining that a second software application is outside the first set, at least one of: stopping execution of the second software application, or refraining from initiating execution of the second software application; at a second time, receiving a second request to operate the vehicle in a second operational mode; determining that the second operational mode is associated with a second set of software applications comprising the second software application; based at least in part receiving the second request, initiating execution of the second software application; and based at least in part on receiving the second request and determining that the first software application is outside the second set, stopping execution of the first software application.

G: The one or more non-transitory computer-readable media of paragraph F, wherein the first operational mode is associated with autonomous control of the vehicle, and wherein the operations further comprise: based at least in part on determining that the first software application is in a first initialized state and the second software application is in a second initialized state, enabling autonomous control of the vehicle.

H: The one or more non-transitory computer-readable media of paragraph G, the operations further comprising: enabling autonomous control of the vehicle based at least in part on determining that a requirement for autonomous control is satisfied, wherein the requirement is associated with at least one of a location or a velocity measure associated with the vehicle.

I: The one or more non-transitory computer-readable media of any of paragraphs F-H, the operations further comprising: based at least in part on receiving the second request, deallocating a first network bandwidth associated with the first software application and allocating at least a portion of the first network bandwidth to the second software application.

J: The one or more non-transitory computer-readable media of any of paragraphs F-I, wherein the second operational mode is associated with at least one of: manual control of the vehicle, remote control of the vehicle, charging of the vehicle, at least one of deploying or updating at least one software application associated with the vehicle, shutting down a vehicle computing device associated with the vehicle, or operating the vehicle with reduced power usage.

K: The one or more non-transitory computer-readable media of any of paragraphs F-J, wherein: the second operational mode is associated with charging the vehicle, and receiving the second request comprises receiving an indication that the vehicle has been connected to a power source.

L: The one or more non-transitory computer-readable media of any of paragraphs F-K, wherein at least one of the first software application or the second software application is associated with at least one of: a first machine-learned model configured to process sensor data associated with a vehicle to detect an object in an environment of the vehicle, a second machine-learned model configured to determine a predicted trajectory for the object, or a third machine-learned model configured to determine a trajectory associated with the vehicle based at least in part on the predicted trajectory.

M: The one or more non-transitory computer-readable media of any of paragraphs F-L, the operations further comprising: determining that a third software application is associated with the first operational mode; determining that the second software application is operationally dependent on the third software application; based at least in part on receiving the first request, initiating execution of the third software application; and based at least in part on receiving the second request and the second software application being operationally dependent on the third software application, maintaining execution of the second software application.

N: The one or more non-transitory computer-readable media of any of paragraphs F-M, wherein: initiating execution of the first software application comprises initiating execution of the first software application on a resource-constrained computing platform associated with a vehicle; and at least one of stopping execution of the second software application or refraining from initiating execution of the second software application comprises at least one of: stopping execution of the second software application on the resource-constrained computing platform, or refraining from initiating execution of the second software application on the resource-constrained computing platform.

O: A method comprising: at a first time, receiving a first request to operate a vehicle in a first operational mode; determining that the first operational mode is associated with a first set of software applications comprising a first software application; based at least in part on receiving the first request, initiating execution of the first software application; based at least in part on receiving the first request and determining that a second software application is outside the first set, at least one of: stopping execution of the second software application, or refraining from initiating execution of the second software application; at a second time, receiving a second request to operate the vehicle in a second operational mode; determining that the second operational mode is associated with a second set of software applications comprising the second software application; based at least in part receiving the second request, initiating execution of the second software application; and based at least in part on receiving the second request and determining that the first software application is outside the second set, stopping execution of the first software application.

P: The method of paragraph O, wherein the first operational mode is associated with autonomous control of the vehicle, and the method comprises: based at least in part on determining that the first software application is in a first initialized state and the second software application is in a second initialized state, enabling autonomous control of the vehicle.

Q: The method of paragraph P, further comprising: enabling autonomous control of the vehicle based at least in part on determining that a requirement for autonomous control is satisfied, wherein the requirement is associated with at least one of a location or a velocity measure associated with the vehicle.

R: The method of any of paragraphs O-Q, further comprising: based at least in part on receiving the second request, deallocating a first network bandwidth associated with the first software application and allocating at least a portion of the first network bandwidth to the second software application.

S: The method of any of paragraphs O-R, wherein the second operational mode is associated with at least one of: manual control of the vehicle, remote control of the vehicle, charging of the vehicle, at least one of deploying or updating at least one software application associated with the vehicle, shutting down a vehicle computing device associated with the vehicle, or operating the vehicle with reduced power usage.

T: The method of any of paragraphs O-S, wherein: the second operational mode is associated with charging the vehicle, and receiving the second request comprises receiving an indication that the vehicle has been connected to a power source.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:

one or more processors; and one or more non-transitory computer-readable media storing computer-executable instructions that, when executed, cause the one or more processors to perform operations comprising:

at a first time, receiving a first request to operate a vehicle in a first operational mode;

determining that the first operational mode is associated with a first set of software applications comprising a first software application and a second software application, wherein at least one of the first software application or the second software application is associated with controlling the vehicle based at least in part on a trajectory that is determined by a vehicle computing device;

based on determining that a third software application is outside the first set, at least one of:

stopping execution of the third software application, or refraining from initiating execution of the third software application;

determining that the second software application is operationally dependent on the first software application;

based at least in part on receiving the first request, initiating execution of the first software application;

based at least in part on determining that the second software application is operationally dependent on the first software application, initiating execution of the second software application based at least in part on a delay period;

at a second time, receiving a second request to operate the vehicle in a second operational mode;

determining that the second operational mode is associated with a second set of software applications comprising the third software application; and based at least in part on receiving the second request and determining that the at least one of the first software application or the second software application are outside of the second set, stopping execution of at least one of the first software application or the second software application; and initiating execution of a third software application associated with the second operational mode.

2. The system of claim 1, wherein the second operational mode is associated with at least one of:

control of the vehicle, charging of the vehicle, at least one of deploying or updating at least one software application associated with the vehicle, shutting down the system, or operating the vehicle with reduced power usage.

3. The system of claim 1, wherein at least one of the first software application or the second software application is associated with at least one of:

a first machine-learned model configured to process sensor data associated with the vehicle to detect an object in an environment of the vehicle, a second machine-learned model configured to determine a predicted trajectory for the object, or a third machine-learned model configured to determine the trajectory based at least in part on the predicted trajectory.

4. The system of claim 1, wherein:

the vehicle is associated with a set of software applications comprising the first software application, the second software application, and the third software application, and the operations comprise, during a period associated with the first operational mode, at least one of preventing or stopping execution of a fourth software application that is in the set of software applications and outside of the first set.

5. The system of claim 1, wherein:

the second operational mode is associated with charging the vehicle; and the operations comprise at least one of preventing or stopping execution of a fourth software application that performs a task unrelated to charging the vehicle.

6. One or more non-transitory computer-readable media storing instructions executable by one or more processors, wherein the instructions, when executed, cause the one or more processors to perform operations comprising:

at a first time, receiving a first request to operate a vehicle in a first operational mode;

determining that the first operational mode is associated with a first set of software applications comprising a first software application and a second software application, wherein at least one of the first software application or the second software application is associated with controlling the vehicle based at least in part on a trajectory that is determined by a vehicle computing device;

based on determining that a third software application is outside the first set, at least one of:

stopping execution of the third software application, or refraining from initiating execution of the third software application;

determining that the second software application is operationally dependent on the first software application;

based at least in part on receiving the first request, initiating execution of the first software application;

based at least in part on determining that the second software application is operationally dependent on the first software application, initiating execution of the second software application based at least in part on a delay period;

at a second time, receiving a second request to operate the vehicle in a second operational mode;

determining that the second operational mode is associated with a second set of software applications comprising the third software application; and based at least in part on receiving the second request and determining that the at least one of the first software application or the second software application are outside of the second set, stopping execution of at least one of the first software application or the second software application; and initiating execution of a third software application associated with the second operational mode.

7. The one or more non-transitory computer-readable media of claim 6, wherein the second operational mode is associated with at least one of:

control of the vehicle, charging of the vehicle, at least one of deploying or updating at least one software application associated with the vehicle, shutting down a vehicle computing device associated with the vehicle, or operating the vehicle with reduced power usage.

8. The one or more non-transitory computer-readable media of claim 6, wherein at least one of the first software application or the second software application is associated with at least one of:

a first machine-learned model configured to process sensor data associated with the vehicle to detect an object in an environment of the vehicle, a second machine-learned model configured to determine a predicted trajectory for the object, or a third machine-learned model configured to determine the trajectory based at least in part on the predicted trajectory.

9. The one or more non-transitory computer-readable media of claim 6, wherein:

the vehicle is associated with a set of software applications comprising the first software application, the second software application, and the third software application, and the operations comprise, during a period associated with the first operational mode, at least one of preventing or stopping execution of a fourth software application that is in the set of software applications and outside of the first set.

10. The one or more non-transitory computer-readable media of claim 6, wherein:

the second operational mode is associated with charging the vehicle; and the operations comprise at least one of preventing or stopping execution of a fourth software application that performs a task unrelated to charging the vehicle.

11. A method comprising:

at a first time, receiving a first request to operate a vehicle in a first operational mode;

determining that the first operational mode is associated with a first set of software applications comprising a first software application and a second software application, wherein at least one of the first software application or the second software application is associated with controlling the vehicle based at least in part on a trajectory that is determined by a vehicle computing device;

based on determining that a third software application is outside the first set, at least one of:

stopping execution of the third software application, or refraining from initiating execution of the third software application;

determining that the second software application is operationally dependent on the first software application;

based at least in part on receiving the first request, initiating execution of the first software application;

based at least in part on determining that the second software application is operationally dependent on the first software application, initiating execution of the second software application based at least in part on a delay period;

at a second time, receiving a second request to operate the vehicle in a second operational mode;

determining that the second operational mode is associated with a second set of software applications comprising the third software application; and based at least in part on receiving the second request and determining that the at least one of the first software application or the second software application are outside of the second set, stopping execution of at least one of the first software application or the second software application; and initiating execution of a third software application associated with the second operational mode.

12. The method of claim 11, wherein the second operational mode is associated with at least one of:

control of the vehicle, charging of the vehicle, at least one of deploying or updating at least one software application associated with the vehicle, shutting down a vehicle computing device associated with the vehicle, or operating the vehicle with reduced power usage.

13. The method of claim 11, wherein at least one of the first software application or the second software application is associated with at least one of:

a first machine-learned model configured to process sensor data associated with the vehicle to detect an object in an environment of the vehicle, a second machine-learned model configured to determine a predicted trajectory for the object, or a third machine-learned model configured to determine the trajectory based at least in part on the predicted trajectory.

14. The method of claim 11, wherein:

the vehicle is associated with a set of software applications comprising the first software application, the second software application, and the third software application, and the method further comprises, during a period associated with the first operational mode, at least one of preventing or stopping execution of a fourth software application that is in the set of software applications and outside of the first set.

15. The method of claim 11, wherein:

the second operational mode is associated with charging the vehicle; and the method further comprises at least one of preventing or stopping execution of a fourth software application that performs a task unrelated to charging the vehicle.

16. The method of claim 11, wherein the first operational mode is associated with autonomous control of the vehicle, and the method comprises:

based at least in part on determining that the first software application is in a first initialized state and the second software application is in a second initialized state, enabling autonomous control of the vehicle.

17. The method of claim 16, further comprising:

enabling autonomous control of the vehicle based at least in part on determining that a requirement for autonomous control is satisfied, wherein the requirement is associated with at least one of a location or a velocity measure associated with the vehicle.

18. The method of claim 11, further comprising:

based at least in part on receiving the second request, deallocating a first network bandwidth associated with the first software application and allocating at least a portion of the first network bandwidth to the second software application.

19. The method of claim 11, wherein the vehicle is an autonomous vehicle.

20. The method of claim 11, wherein:

the second operational mode is associated with charging the vehicle, and receiving the second request comprises receiving an indication that the vehicle has been connected to a power source.

* * * * *